US006902437B1

(12) United States Patent
Wang

(10) Patent No.: US 6,902,437 B1
(45) Date of Patent: Jun. 7, 2005

(54) REMOVABLE FASTENING MECHANISM CONNECTABLE TO SOCKET OF CIGAR LIGHTER OF AUTOMOBILE

(76) Inventor: Chin-Yang Wang, No. 24-110, Shao An Tsu, Pai Ho Town, Tainan Hsien (TW)

( * ) Notice: Subject to any disclaimer, the term of this patent is extended or adjusted under 35 U.S.C. 154(b) by 0 days.

(21) Appl. No.: 10/671,800

(22) Filed: Sep. 29, 2003

(51) Int. Cl.[7] .................................................. H02R 2/04
(52) U.S. Cl. ........................................ 439/668; 439/265
(58) Field of Search ................................ 439/668, 669, 439/265

(56) References Cited

U.S. PATENT DOCUMENTS 2,892,990 A * 6/1959 Werndl ........................ 439/265
4,109,988 A * 8/1978 Olson .......................... 439/265
4,904,200 A * 2/1990 Williams .................... 439/349
5,116,248 A * 5/1992 Hiers et al. ................. 439/669
5,860,824 A * 1/1999 Fan ............................ 439/265
6,135,798 A * 10/2000 Saruta et al. ............... 439/259
6,695,648 B2 * 2/2004 Liao ........................... 439/668

* cited by examiner

*Primary Examiner*—Neil Abrams
(74) *Attorney, Agent, or Firm*—Bacon & Thomas, PLLC

(57) ABSTRACT

The present invention is to provide a removable fastening mechanism comprising a hollow shank including external threads on an outer surface at one end and conical means proximate the other end; a rotatable ring including internal threads in a bore enabling the rotatable ring to move back and forth along the length of the external threads; two curved plates inserted into a flexible sleeve for urging on the shank from two opposite directions, the curved plates being disposed between the rotatable ring and the conical means, wherein turning and moving the rotatable ring toward the curved plates will gradually push the curved plates and the flexible sleeve to a diameter firmly fixed to a socket of a cigar lighter of an automobile.

10 Claims, 4 Drawing Sheets

REMOVABLE FASTENING MECHANISM CONNECTABLE TO SOCKET OF CIGAR LIGHTER OF AUTOMOBILE

FIELD OF THE INVENTION

The present invention relates to removable fastening mechanisms and more particularly to a removable fastening mechanism adapted to connect to the socket of a cigar lighter of a motor vehicle with improved characteristics.

BACKGROUND OF THE INVENTION

GPS (Global Positioning System) has been widely employed in many applications such as AVL (Automatic Vehicle Location) and AVM (Automatic Vehicle Monitoring) mounted in a fire engine, police car, ambulance, hazardous product carrying vehicle, bus, or truck for monitoring and management purposes. GPS can be combined with a navigation system to form an AVLN (Automatic Vehicle Location and Navigation System).

An implementation of the popular AVLN comprises installing a GPS engine, a GPS antenna, an e-map, and a platform (or software) in a car, and displaying the current location of the car and related routes on an LCD (Liquid Crystal Display) or a TFT (Thin Film Transistor) LCD on the instrument board. As such, a driver can choose an optimum route to the destination by referring to the same.

For keeping up with the trend of developing multifunctional electronic products, a PDA (Personal Digital Assistant) having the feature of GPS has been commercially available recently. Scheduler, notebook, and phonebook features of the PDA can be used in an office, home, or an outdoor environment. Moreover, the PDA can be used as GPS based navigation device while driving a car. That is why the PDAs are widely used by many consumers.

Moreover, for safety reasons it is inappropriate to hold a steering wheel with one hand and hold a mobile phone with the other hand while driving. As such, it is typical that a driver couples a mobile phone to a mobile sound system. In a case of an incoming call occurred, a speaker of the sound system will amplify the ringing. Further, an immediate talking between the driver and the calling party can be amplified. Hence, the driver can talk with the calling party without holding the mobile phone with the other hand.

A well known connecting assembly has been developed for facilitating a driver to operate a mobile phone and a PDA, or view an LCD. Such connecting assembly 1 is illustrated in FIG. 1. As shown, the connecting assembly 1 comprises an arm 11, a seat 12 at one end of the arm 11 for securely coupling to and supporting an electronic device (e.g., PDA, mobile phone, or LCD TV) thereon, and a removable fastening mechanism 13 at the other end of the arm 11 for connecting to a socket of a cigar lighter of a car, the removable fastening mechanism 13 comprising a rotatable ring 131, a first conical member 132, a flexible sleeve 133, and a second conical member 134. One end of the rotatable ring 131 is coupled to the arm 11 and a threaded shank 135 is extended from the other end thereof. The threaded shank 135 is driven through the bores of the first conical member 132 and the flexible sleeve 133 into a threaded bore of the second conical member 134 for fastening.

By configuring as above, in use a driver may first insert the removable fastening mechanism 13 into the socket of cigar lighter of car. Next, rotate the rotatable ring 131 for driving the threaded shank 135 into the bore of the second conical member 134 and thus pushing the first conical member 132 toward the second conical member 134. This in turn shortens the distance between the first conical member 132 and the second conical member 134 gradually. Further, conical surfaces at both sides of the flexible sleeve 133 are pressed toward each other by the first conical member 132 and the second conical member 134. As such, the length of the flexible sleeve 133 is shortened and the diameter thereof is increased. Finally, inside of the socket of the cigar lighter is filled by the flexible sleeve 133. This can achieve the purpose of fastening the connecting assembly 1 in the socket of the cigar lighter. Therefore, using the electronic device mounted on the seat 12 by the driver can be facilitated.

However, a turning of the rotatable ring 131 will also turn both the arm 11 and the seat 12 since the rotatable ring 131 is securely coupled to the arm 11. Hence, the seat 12, in often times, cannot be rotated to an optimum position when the diameter of the flexible sleeve 133 is increased to stuff itself in the socket of the cigar lighter. This may in turn cause inconvenience in operating the electronic device. Two techniques have been proposed to adjust the seat 12 to an optimum position as detailed below.

The first technique requires a driver to turn the rotatable ring 131 until the seat 12 has reached an optimum operating angle or position. However, in often times, it may compress the flexible sleeve 133 excessively, resulting in an elastic fatigue or even crack of the flexible sleeve 133. Alternatively, it is possible that a driver cannot rotate and unfasten the rotatable ring 131 if the socket of the cigar lighter is overstuffed by the removable fastening mechanism 13, resulting in a failure of removing the connecting assembly 1 from the socket of the cigar lighter.

The second technique requires a driver to slightly turn the rotatable ring 131 until it is loosened. Next, adjust the seat 12 to an optimum operating angle or position. However, it may vibrate the connecting assembly 1 while driving on a rough road since the removable fastening mechanism 13 is not secured to the socket of the cigar lighter. As a result, an easy operation of the electronic device mounted on the seat 12 is even impossible.

Thus, it is desirable among users to provide a novel removable fastening mechanism 13 which once connected to the socket of the cigar lighter, a turning of the rotatable ring 131 will not turn the arm 11 either. As a result, it is easy to adjust the seat 12 to an optimum position, thereby enabling a driver to easily operate an electronic device mounted on the seat 12.

SUMMARY OF THE INVENTION

An object of the present invention is to provide a removable fastening mechanism connectable to a socket of a cigar lighter of an automobile wherein a seat coupled to one end of the removable fastening mechanism can be adjusted to an optimum operating angle or position for facilitating a driver to operate an electronic device mounted on the seat.

The above and other objects, features and advantages of the present invention will become apparent from the following detailed description taken with the accompanying drawings.

DETAILED DESCRIPTION OF THE PREFERRED EMBODIMENTS

Figure 1:
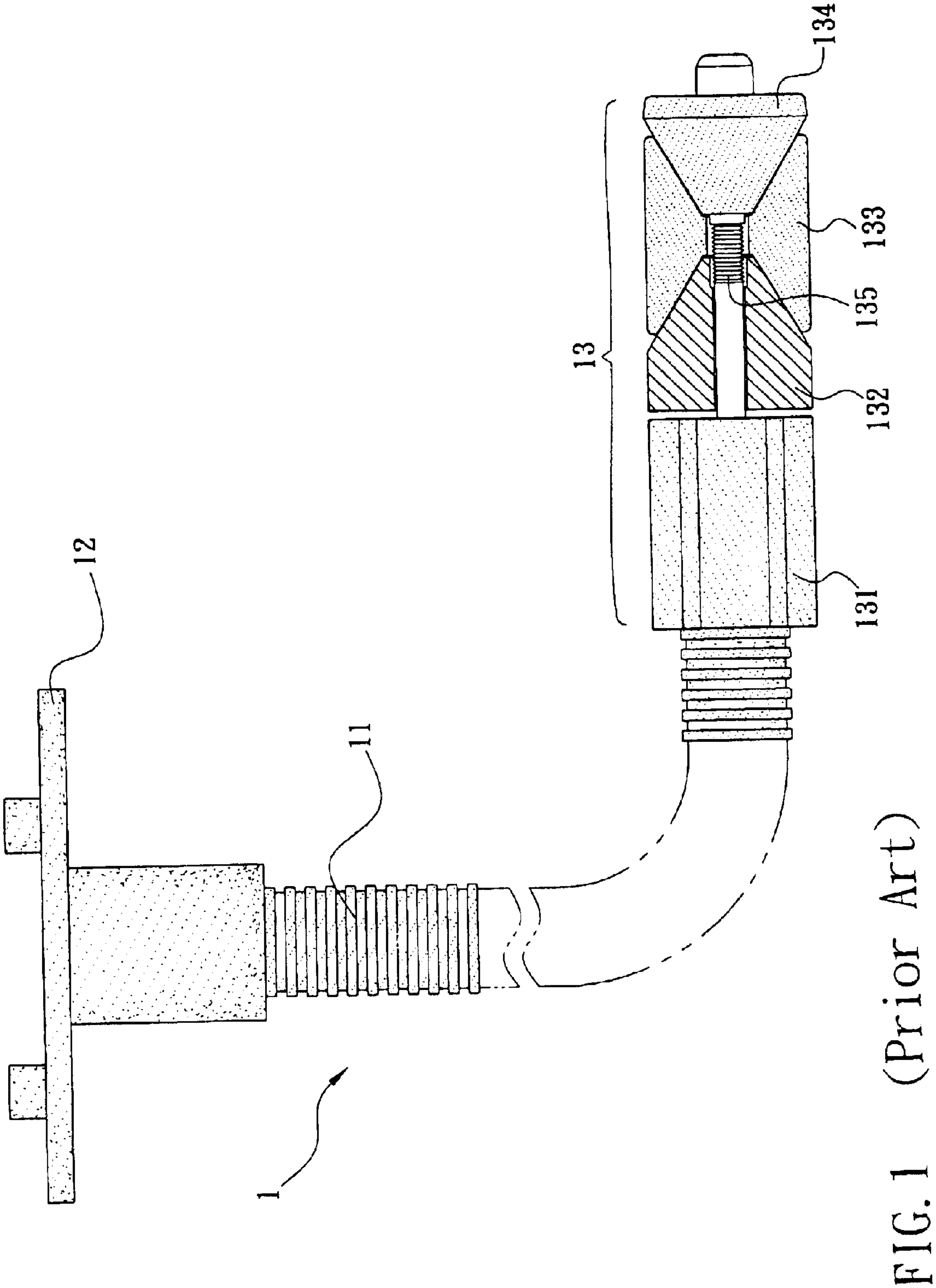
FIG. 1 (Prior Art)
FIG. 1 is a schematic sectional view of a conventional connecting assembly having a removable fastening mechanism connectable to a socket of a cigar lighter of an automobile.
Figure 2:
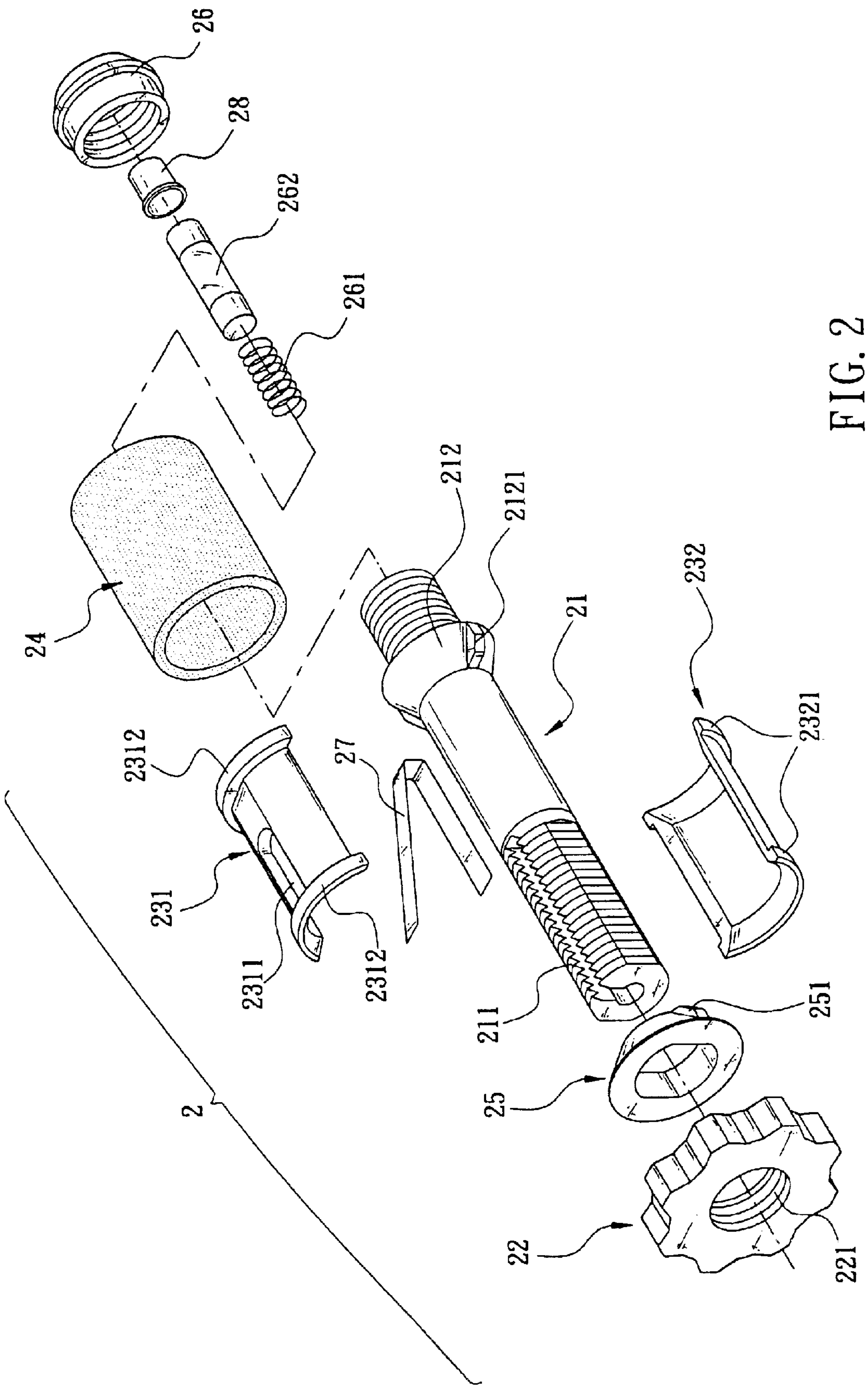
FIG. 2 is an exploded view of a removable fastening mechanism according to the invention.
Figure 3:
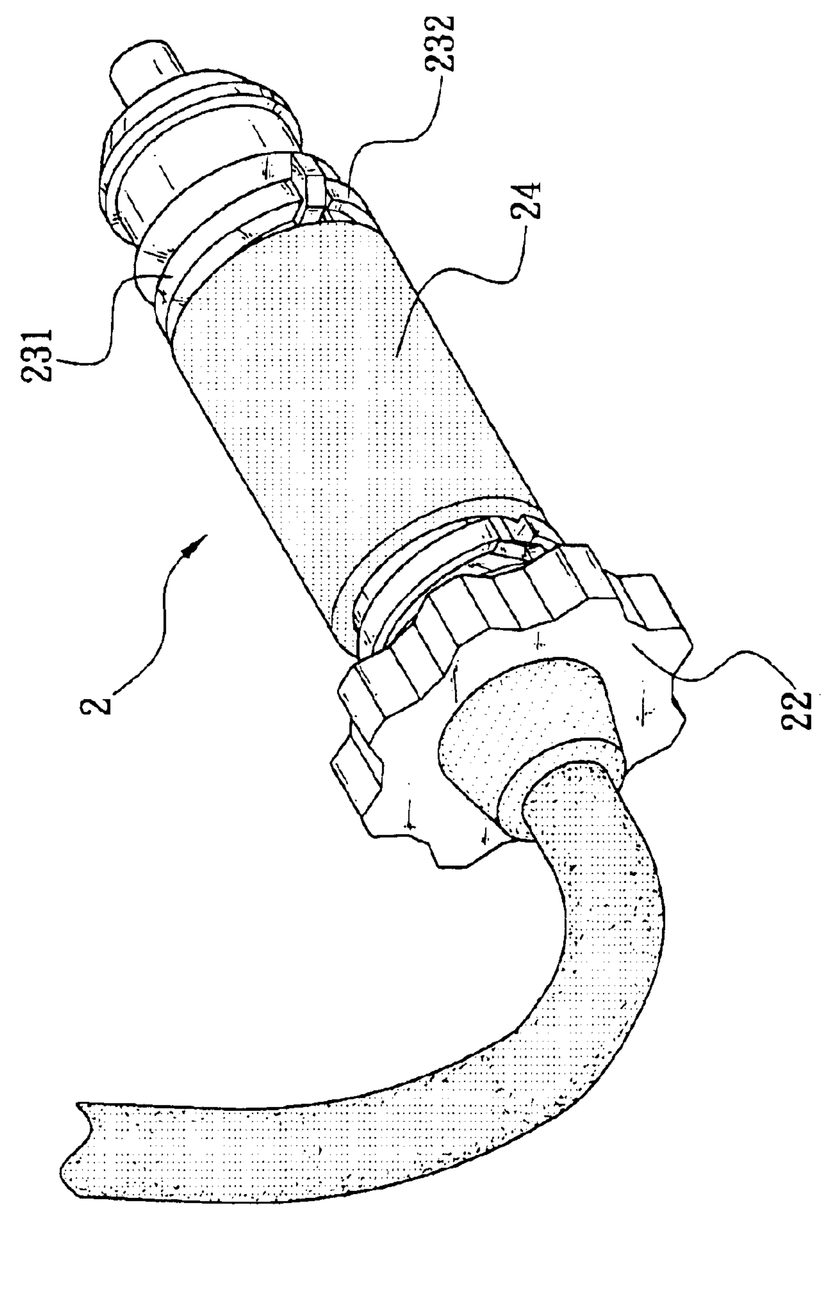
FIG. 3 is a perspective view of the assembled removable fastening mechanism shown in FIG. 2.

Referring to FIG. 2, there is shown a removable fastening mechanism 2 connectable to a socket of a cigar lighter of an automobile in accordance with the invention. The removable fastening mechanism 2 comprises a hollow shank 21, a rotatable ring 22, two curved plates 231 and 232, and a flexible sleeve 24 which is formed of rubber being adapted to appropriately deform and return to the same once a force exerted thereon is removed. External threads 211 are formed on an outer surface of the hollow shank 21 at one end and a conical member 212 is formed around the hollow shank 21 proximate the other end. Internal threads 221 are formed in the bore of the rotatable ring 22. The internal threads 221 may be driven onto the external threads 211 so that the rotatable ring 22 may be threadedly moved along the length of the external threads 211 back and forth. Referring to FIG. 3, the flexible sleeve 24 is put on the curved plates 231 and 232 for urging the curved plates 231 and 232 on the hollow shank 21 from two opposite directions. The curved plates 231 and 232 are disposed between the rotatable ring 22 and the conical member 212.

By configuring as above, in use a driver may first insert the removable fastening mechanism 2 into the socket of cigar lighter of car. Next, rotate the rotatable ring 22 for pushing it toward the socket of the cigar lighter. Further, the curved plates 231 and 232 are gradually pushed toward the surface of the conical member 212 by the rotatable ring 22. The diameter of the removable fastening mechanism 2 will increase gradually since the surface of the conical member 212 is inclined. Eventually, the removable fastening mechanism 2 stuffs inside of the socket of the cigar lighter. As a result, the removable fastening mechanism 2 is fastened in the socket of the cigar lighter. To the contrary a driver may turn and loosen the rotatable ring 22 for moving it away from the socket of the cigar lighter. At the same time, the curved plates 231 and 232 may return to their original positions with respect to the hollow shank 21 by the elastic expansion of the flexible sleeve 24. Finally, the diameter of the removable fastening mechanism 2 returns to its original length, resulting in a loosening of the removable fastening mechanism 2 from the socket of the cigar lighter. At the moment, the driver can remove the removable fastening mechanism 2 from the socket of the cigar lighter.

As stated above, the curved plates 231 and 232 are pushed toward the inclined surface of the conical member 212 as the rotatable ring 22 rotates. Also, the diameter of the removable fastening mechanism 2 increases until it is fastened in the socket of the cigar lighter. For further enhancing the fastening of the removable fastening mechanism 2 in the socket of the cigar lighter, the removable fastening mechanism 2 may further comprises a moveable conical member 25 on the hollow shank 21 between the rotatable ring 22 and the conical member 212 (see FIG. 2). The inclined surface of the moveable conical member 25 is opposite that of the conical member 212. Also, the flexible sleeve 24 and the curved plates 231 and 232 are disposed between the moveable conical member 25 and the conical member 212. By configuring as above, in use a driver may first insert the removable fastening mechanism 2 into the socket of cigar lighter. Next, rotate the rotatable ring 22 for pushing it toward the socket of the cigar lighter. Further, the moveable conical member 25 are gradually pushed toward and inserted in one ends of the curved plates 231 and 232 by the rotatable ring 22. Furthermore, the conical member 212 is inserted in the other ends of the curved plates 231 and 232. As such, the diameters of the removable fastening mechanism 2 at both ends will increase. As a result, the curved plates 231 and 232 are securely fastened in the socket of the cigar lighter with the flexible sleeve 24 being compressed against the interior wall of the socket of the cigar lighter.

Figure 4:
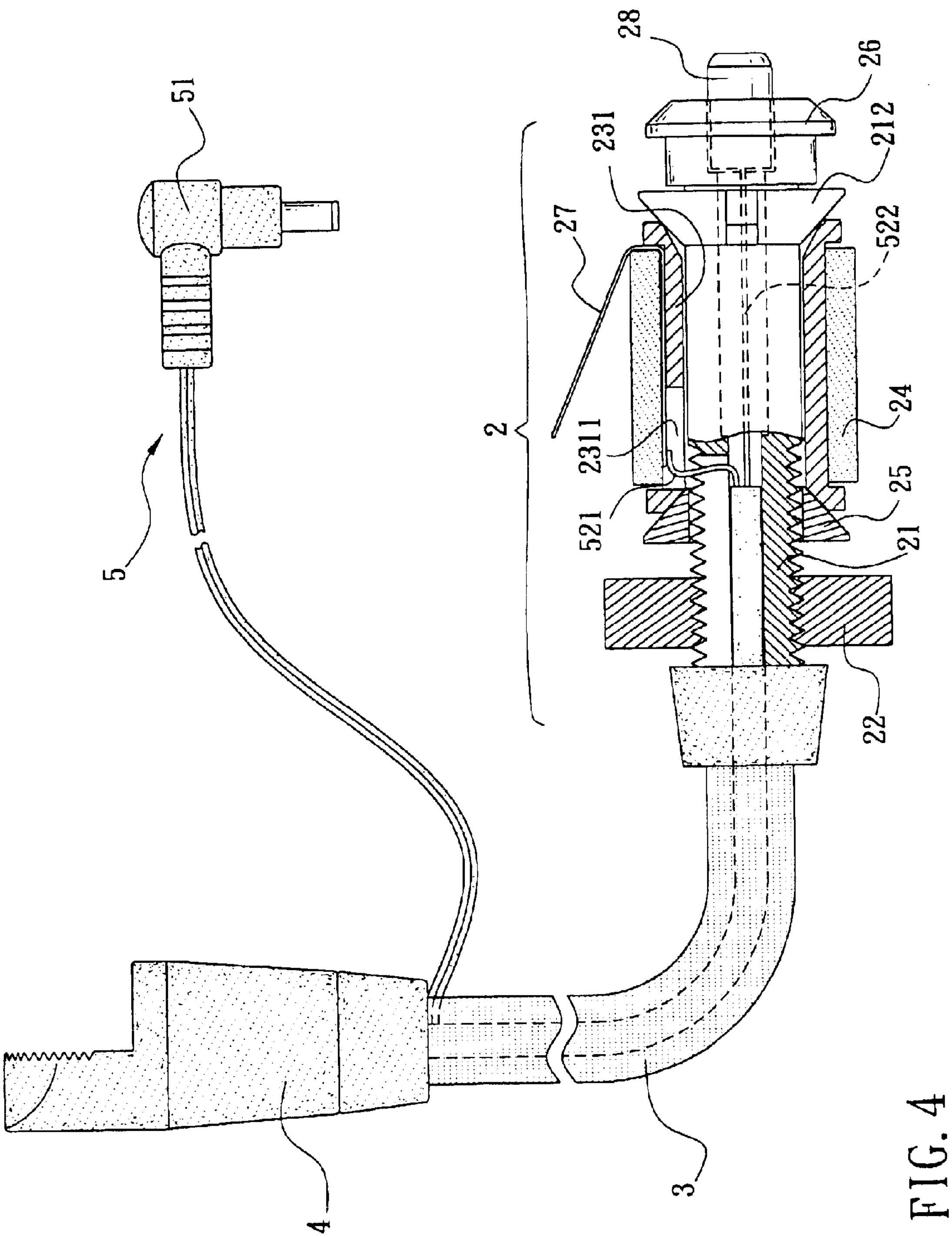
FIG. 4 is a schematic sectional view of the removable fastening mechanism of FIG. 2 connected to a seat and a power cord via an arm.

Referring to FIG. 4, in the invention the removable fastening mechanism 2 further comprises a hollow arm 3 having one end coupled to one end of the hollow shank 21 and the other end coupled to a seat 4 with an electronic device (e.g., a PDA having the feature of GPS, a mobile phone, or an LCD TV) mounted thereon.

Referring to FIGS. 2 and 4, in the invention a first hole is formed at the bore of the hollow shank 21. An opening 2311 is formed on the surface of the curved plate 231. The opening 2311 is in communication with the first hole. Also, a conductive piece 27 has one end gripped between the flexible sleeve 24 and the curved plate 231. A plug 51 at one end of a power cord 5 is located outside the hollow shank 21. One terminal 521 at the other end of the power cord 5 is inserted through the first hole into the opening 2311 to couple to the conductive piece 27. The other terminal 522 at the other end of the power cord 5 extends through the first hole to couple to a hollow, cylindrical conductive terminal 28 at the other end of the hollow shank 21.

Referring to FIGS. 2 and 4 again, in the invention the other end of the hollow shank 21 is at a position proximate the conical member 212 but distal the rotatable ring 22. As such, a sleeve 26 having internal threads may be threadedly coupled to the hollow shank 21. A second hole is formed in the bore of the sleeve 26. The second hole is in communication with the first hole. As such, the conductive terminal 28 may be fastened in the sleeve 26 with one end of the conductive terminal 28 projected from the second hole.

Referring to FIGS. 2 and 4 again, a third hole is further formed in the bore of the hollow arm 3. The third hole may communicate with the first hole and allow the power cord 5 to extend in the third hole as one end of the hollow arm 3 is coupled to one end of the hollow shank 21. Hence, the plug 51 at one end of the power cord 5 may be located outside the other end of the hollow arm 3. By configuring as above, in a case of the removable fastening mechanism 2 mounted in the socket of the cigar lighter, the power cord 5 may be electrically coupled to the positive and negative terminals in the socket of the cigar lighter through the conductive terminal 28 and the conductive piece 27. Thus, power for activating the electronic device can be fed thereto when the plug 51 is inserted into a power socket of the electronic device.

Referring to FIGS. 2 and 3, means for preventing the curved plates 231 and 232 from undesirably rotating around the hollow shank 21 is provided by the invention. In detail, two opposite ribs 2121 are formed on the inclined surface of the conical member 212. Also, two opposite ribs 251 are formed on the inclined surface of the moveable conical member 25. The opposite ribs 251 correspond to the opposite ribs 2121. By configuring as above, the opposite ribs 2121, 251 are served as a spacer for separating one curved plate 231 from the other curved plate 232. Hence, a turning of the rotatable ring 22 can either bring the curved plates 231 and 232 toward the hollow shank 21 from opposite sides or move the curved plates 231 and 232 away from each other without an undesired rotation around the hollow shank 21. Moreover, two ends at the bore of the moveable conical member 25 are flat and two ends of the external threads 211 are also flat. As an end, the moveable conical member 25 can move back and forth along the hollow shank 21 as the moveable conical member 25 is threadedly coupled to the external threads 211 without an undesired rotation around the hollow shank 21.

Referring to FIG. 2, in the invention projecting ridges are formed around the outer surface of the rotatable ring 22. Hence, in use a driver may exert force on the rotatable ring 22 for increasing friction for facilitating the rotation of the rotatable ring 22. Also, an arcuate flange 2312 is formed at either end of the curved plate 231 and an arcuate flange 2321 is formed at either end of the other curved plate 232. By configuring as above, the flexible sleeve 24 can be disposed between the arcuate flanges 2312, 2321 at one end and the arcuate flanges 2312, 2321 at the other end.

Referring to FIG. 2 again, a resilient member (e.g., spring) 261 can be provided in the second hole. As such, the conductive terminal 28 can be inserted through the third hole or pressed into the sleeve 26. Moreover, a fuse 262 may be provided between the resilient member 261 and the conductive terminal 28 for electrical safety in operation.

While the invention has been described by means of specific embodiments, numerous modifications and variations could be made thereto by those skilled in the art without departing from the scope and spirit of the invention set forth in the claims.

What is claimed is:

1. A removable fastening mechanism for connecting to a socket of a cigar lighter of a motor vehicle, comprising:

a hollow shank including external threads on an outer surface at one end and conical means proximate the other end;

a rotatable ring including internal threads in a bore, the internal threads being threadedly coupled onto the external threads so that the rotatable ring is operative to move back and forth along the length of the external threads;

a flexible sleeve; and two curved plates inserted into the flexible sleeve for urging on the shank from two opposite directions, the curved plates being disposed between the rotatable ring and the conical means, wherein turning and moving the rotatable ring toward the curved plates will gradually push the curved plates to an inclined surface of the conical means for gradually increasing a diameter of the flexible sleeve put on the curved plates.

2. The removable fastening mechanism of claim 1, further comprising a moveable conical member on the shank between the rotatable ring and the conical means, and wherein an inclined surface of the moveable conical member is opposite that of the conical means and the curved plates and the flexible sleeve put on the curved plates are disposed between the moveable conical member and the conical means.

3. The removable fastening mechanism of claim 2, further comprising a hollow arm, the hollow arm having one end coupled to one end of the shank and a seat at the other end of the arm for mounting an electronic device thereon;

a first hole at a bore of the shank;

an opening on a surface of one curved plate, the opening being in communication with the first hole, a conductive piece having one end gripped between the flexible sleeve and one curved plate, a power cord having an end plug located outside the shank, a first terminal at the other end inserted through the first hole into the opening to couple to the conductive piece, and a second terminal at the other end, and a hollow, cylindrical conductive terminal at the other end of the shank, and wherein the second terminal is extended through the first hole to couple to the hollow, cylindrical conductive terminal.

4. The removable fastening mechanism of claim 3, further comprising a sleeve member having internal threads, the sleeve member being threadedly coupled to the shank, and wherein the sleeve member includes a second hole in a bore in communication with the first hole so that the conductive terminal is adapted to fasten in the sleeve member and one end of the conductive terminal is projected from the second hole.

5. The removable fastening mechanism of claim 4, further comprising a third hole in a bore of the arm, and wherein the third hole is in communicate with the first hole, the power cord is extended in the third hole, and the plug at one end of the power cord is located outside the other end of the arm in response to coupling one end of the arm to one end of the shank.

6. The removable fastening mechanism of claim 5, further comprising a resilient member between the second terminal of the power cord and the conductive terminal, the resilient member being operative to push the conductive terminal through the third hole or into the sleeve member.

7. The removable fastening mechanism of claim 6, further comprising a fuse between the resilient member and the conductive terminal.

8. The removable fastening mechanism of claim 7, further comprising two opposite first ribs on the inclined surface of the conical means and two opposite second ribs on the inclined surface of the moveable conical member, wherein the first ribs correspond the second ribs, and the first and the second ribs are disposed to separate one curved plate from the other curved plate for disabling a turning of the curved plates around the shank.

9. The removable fastening mechanism of claim 2, wherein two ends at a bore of the moveable conical member are flat and two ends of the external threads are flat so that the moveable conical member is operative to move back and forth along the shank in response to threadedly coupling the moveable conical member to the external threads, and a turning of the moveable conical member around the shank is disabled.

10. The removable fastening mechanism of claim 2, further comprising a first arcuate flange at either end of one curved plate and a second arcuate flange at either end of the other curved plate, wherein the flexible sleeve is adapted to dispose between the first and the second flanges at one end and the first and the second flanges at the other end.

* * * * *